Figure 1:
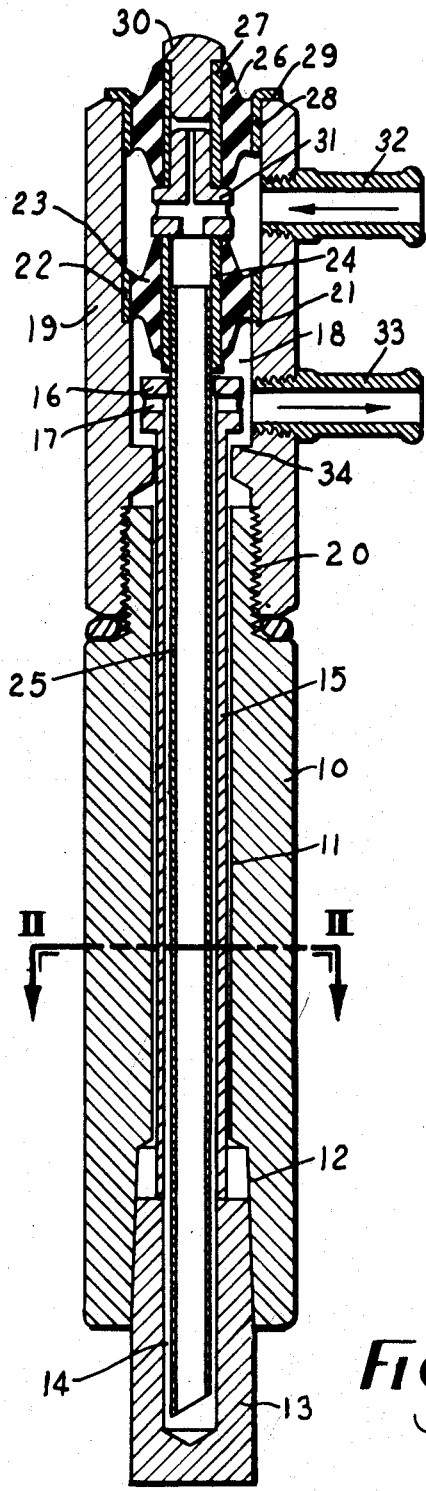

Sept. 18, 1945.   M. M. SEELOFF   2,385,108
WELDING ELECTRODE HOLDER
Filed April 13, 1944

Inventor
MELVIN M. SEELOFF
By Francis J. Klempay
Attorney

Patented Sept. 18, 1945

2,385,108

UNITED STATES PATENT OFFICE 2,385,108

WELDING ELECTRODE HOLDER

Melvin M. Seeloff, Warren, Ohio, assignor to The Taylor-Winfield Corporation, Warren, Ohio, a corporation of Ohio Application April 13, 1944, Serial No. 530,908

14 Claims. (Cl. 219—4)

This invention relates to welding electrode holders and more particularly to electrical conductive devices for securing and conducting welding current to removable and replaceable welding electrode tips. Such devices are also commonly provided with means to circulate cooling fluid through the holder and separable tip and, in addition, it has heretofore been proposed to provide the holder with means to facilitate the ejection of the tip when it is desired to remove or replace the tip. It should be understood that in normal usage the work-engaging tip of a welding electrode is subject to such conditions of impact, heat and pressure that the same must be frequently replaced to maintain the efficiency of the welding machine in which the electrode is employed.

The primary object of the invention is the provision of an improved electrode holder having the characteristics pointed out above which is substantially less susceptible to the development of coolant fluid leakage irrespective of the rough treatment to which such holders are necessarily subjected in ejecting the tips from the holders. In accordance with the prior practice the electrode tip holder comprises principally a body member having a bore therethrough and an inwardly tapering recess at one end thereof of somewhat larger diameter than the bore to receive and frictionally retain tapered end portions of the electrode tips. Extending through the bore and having abutting engagement with the inner end of the tip is a tubular member which is arranged to be moved longitudinally of the body member, by means of a hammer blow for example, for the purpose of ejecting the tip from the holder. Further, since it is desirable to cool the tip itself the same is provided with a bore open to the inner end thereof and extending into this bore is a fluid conducting tube which extends longitudinally through said tubular member. Thus cooling fluid may be conducted into the tip through the inner tube and away from the tip through the outer movable tubular member or vice versa and it should be therefore apparent that fluid sealing means must be provided between the concentric inner and outer fluid conducting tubes and the space outside the holder or body portion proper. Heretofore such sealing means has been provided by inserting a packing ring between the bore in the body portion of the holder and the outer tubular member and attaching to the protruding outer end of the tubular member a fitting carrying the inner tube and having inlet and outlet ports communicating with the passages through the inner and outer tubes.

In ejecting the electrode tip from an assembly as described immediately above a hammer blow is applied to the fitting and the resultant movement transmitted through the outer tubular member is effective to eject the tip from the holder. Repeated shocks of this character tend to loosen the packing thus breaking the fluid seal intermediate the bore of the principal body portion of the holder and the outermost of the tubes extending into the holder and causing the holder to leak. Also, the application of the blow directly to the fitting having the inlet and outlet ports for the cooling fluid rapidly tends to loosen the fitting interconnecting the external fluid conducting lines with the ports. A further object of the invention therefore is the provision of an improved electrode holder comprising a body member having a fluid conducting tube extending into one end thereof to engage an electrode tip frictionally retained by said holder which provides for the longitudinal movement of said tubular member by the application of a hammer blow for the purpose of ejecting an electrode tip but which, nevertheless insures a fluid tight seal irrespective of repeated applications of the hammer-like blows.

A more specific object of the invention is the provision of an improved construction and arrangement of an electrode tip holder of the general character described above whereby the hammer blow or blows required to eject the electrode tip is not applied directly to the fitting carrying the inlet and outlet nipples for the cooling fluid but rather is applied to a member having a permanently resilient interconnection with said fitting to the end that the assembly is more rugged and durable in service.

The above and other objects and advantages of the invention will become apparent upon consideration of the following detailed specification and the accompanying drawing wherein there is disclosed a preferred embodiment of the invention.

Figure 2:
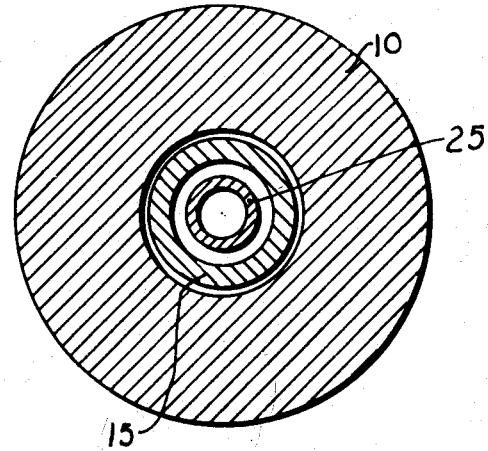

In the drawing:

Figure 1 is a longitudinal section of a welding electrode tip holder constructed in accordance with the principles of the invention; and Figure 2 is a transverse section of the device of Figure 1.

Reference numeral 10 designates a tubular body member having a bore 11 extending therethrough and an inwardly tapered recess 12 extending inwardly from one end of the body member and being of somewhat larger diameter than the diameter of the bore 11. It will be understood by those familiar with the art that the tubular body member 10 is, when in actual use, inserted in a current conductive clamp forming a part of one or the other of the current conductive horns of the welding machine. Body member 10 is therefore formed of copper or other metal or alloy having good current conducting characteristics. Frictionally retained in the recess 12 is a welding electrode or tip 13 which is provided with a tapering end portion adapted to complement the taper on the wall of the recess 12. Extending inwardly from this same end of the tip 13 is a bore 14 arranged to be filled with circulating cooling fluid to cool the metal of the electrode during welding operations.

Extending through the bore 11 is a tubular member 15, the inner or lower end of which abuts against the inner end of the electrode 13. The upper or outer end of the tubular member 15 is provided with a heavy flange 16 having circumferentially spaced but radially extending apertures 17 for the passage of fluid out of the space within the tubular member 15. Flange 16 is retained or housed in the lower or inner end of a space 18 formed in a fitting 19. As shown, an end of the fitting 19 is screw-threadedly connected at 20 to the end of the body member 10 opposite the electrode 13.

An internal shoulder 21 is formed in the fitting 19 against which is lodged a metal ring 22. Positioned within ring 22 and securely and permanently fused or bonded thereto is a bushing 23 of rubber or other suitable resilient material and positioned within the opening extending through the bushing 23 and similarly fused or bonded to this bushing is a nipple 24 in which is received an end of an inner tube 25 which, as shown, extends entirely through the tubular member 15 and into the electrode 13 substantially to the end of the bore 14 formed therein. Tube 25 is carried by nipple 24, any suitable expedient being used to retain the end of the tube in the nipple.

Inserted in the outer end of the fitting 19 is a resilient bushing 26 similar to the bushing 23. Extending through the aperture of the bushing 26 and permanently bonded or fused thereto is a nipple 27 and similarly bonded or fused to the outer periphery of the bushing 26 is a ring 28 the outer edge of which is flanged outwardly at 29 to overlie the outer end of the fitting 19. Extending into the outer end of the nipple 27 is a headed member 30 and extending into the opposite end of the nipple 27 is a member 31 having an enlarged portion to overlie the adjacent ends of the nipples 24 and 27. In the enlarged portion of the member 31 there are formed intercommunicating radial and longitudinal passages whereby fluid coming into the fitting intermediate the bushings 23 and 26 may be conducted into the nipple 24 and tube 25. Fluid is so conducted into the fitting 19 by means of a fitting 32 to which may be connected a flexible fluid conducting conduit as will be understood.

A fitting 33, which may be identical with fitting 32 is inserted in the side wall of the fitting 19 inwardly of the bushing 23 and substantially opposite the opening 17 in the flange 16. It should be observed that the upper end of the longitudinal opening through the flange 16 of the tubular member 15 is somewhat reduced in diameter so that fluid passing up through the tubular member 15 and outwardly of the tube 25 will be diverted outwardly through the opening 17 and thus into the fitting 33 for conduction through a flexible conduit which may be attached to the fitting 33. There is thus provided a continuous fluid circulatory passage whereby fluid entering at 32 will be caused to circulate in close proximity with the walls of the space 14 in the electrode 13 before passing out of the assembly at 33.

When it is desired to eject the electrode 13 from the holder 10 a hammer blow on the member 30 will be transmitted to the electrode 13 through the members 27, 31, 24 and 15 in succession thereby forcing the electrode 13 out of its socket 12. The bushings 26 and 23 yield or flex sufficiently to enable this action to be effected and, of course, after completion of the blow the inherent resiliency of the bushing 26 and 23 will restore these parts back to their original state or condition which is shown in the drawing. The tubular member 25 is prevented from falling out of the holder 10 upon extraction of the electrode 13 by the flange 16 which engages an internal shoulder 34 formed in the fitting 19.

It should now be apparent that I have provided an improved electrode holder which fully accomplishes the objects initially set out. The permanent nature of the connections between the flexible or longitudinally yieldable bushings 23, 26 and the parts 24, 22, 27 and 28 together with the further fact that these parts may be and preferably are press fitted into or over their contiguous elements provides a permanently leak-proof construction which may be actuated repeatedly in ejecting successive electrodes without probability of failure. Moreover, since the rapid movement or shock resulting from the hammer blows applied in ejecting the electrodes does not reach the body member 10 or the fitting 19 the latter and their immediately connected parts are not subject to damage or excessive wear. It should also be observed that inasmuch as the parts required to be moved in ejecting the electrode 13 are all of relatively small dimension and mass the ejecting force impulses are transmitted to the electrode with a minimum of loss so that a less violent blow is required for the ejection of the electrode. Another singular advantage of the invention is that any radial components of force applied to the anvil 30, as may be occasioned by the application of a glancing blow, for example, will be readily absorbed by the resilient material of the bushing 26 thereby further lessening the probability of damage to any of the parts of the assembly including the fluid conducting and restraining means.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. A welding electrode holder comprising a tubular body member having a socket at one end adapted to receive a portion of a welding electrode to frictionally retain said welding electrode, a pair of concentric tubes in said member the outer of which is adapted to abut the inner end of an electrode seated in said socket, the inner of said concentric tubes extending outwardly of said outer tube, a pair of longitudinally spaced bushings in said member and each having a fluid-tight interconnection with the side wall thereof, said inner tube having a fluid-tight connection with the opening through the innermost of said bushings, ports in the side wall of said member on opposite sides of said innermost bushing, an outwardly headed member secured in fluid-tight relation in the outermost of said bushings, and means to transmit longitudinal movement from said headed member through the inner portion of said innermost bushing to said outer tube whereby said electrode may be ejected, said bushings being inherently resilient and yieldable in an axial direction to permit said transmission of movement.

2. A welding electrode holder comprising in combination a tubular body member having a socket at one end adapted to receive a portion of a welding electrode to frictionally retain said welding electrode, a fluid conducting tube positioned in and slideable longitudinally in said body member, said tube adapted to have abutting engagement with the inner end of said electrode, and means to effect longitudinal sliding movement of said tube relative to said member whereby said electrode may be ejected from said member comprising a bushing fitted within said member outwardly of the end of said tube opposite said electrode, said bushing being inherently resilient and yieldable in an axial direction and having a centrally disposed portion adapted to engage said end of said tube whereby axial movement of said tube may be effected by axial movement of the center portion of said bushing.

3. A device according to claim 2 further characterized in that said bushing is fluid-tight and is provided with an axial opening therethrough, a second tube positioned in fluid-tight relation in said opening and extending into the first mentioned tube, and a port in the side wall of said body member intermediate said bushing and the socket end thereof.

4. A device according to claim 2 further characterized in that said bushing is fluid-tight and is provided with an axial opening therethrough, a second tube positioned in fluid-tight relation in said opening and extending into the first mentioned tube, a port in the side wall of said body member intermediate said bushing and the socket end thereof, and a port in the side wall of said body member on the opposite side of said bushing, said last mentioned port communicating with the space within said second tube.

5. In an electrode holder comprising a hollow body having an open end adapted to removably retain a welding electrode tip the combination of a sleeve slideably mounted in said body and adapted to have abutting engagement with said electrode tip, a flange on said sleeve, an internal shoulder in said body for engaging said flange for limiting outward movement of said sleeve relative to said body, a resilient and axially yieldable body closing member in said body member outwardly of said flange, and a port in the side wall of said body member inwardly of said body closing member.

6. In an electrode holder comprising a hollow body having an open end adapted to removably retain a welding electrode tip and a sleeve slideable in said body and adapted to have abutting engagement with said tip the combination of a bushing fitted in said body outwardly of said sleeve; said bushing having an outer ring fitting within the opening in said body, an inner ring, and yieldable fluid impervious material intermediate said rings and securely bonded thereto; and means to move said inner ring axially into engagement with said sleeve whereby said electrode tip may be ejected from said body.

7. A device according to claim 6 further including an inner tube extending through said sleeve and having its outer end received in said inner ring in fluid-tight relation, ports in the side wall of said body on opposite sides of said bushing, said means to apply axial movement to said inner ring comprising a fitting engaging the outer end of said inner ring, said fitting being operative to provide communication between the port on the outer side of said bushing and the space within said inner tube.

8. A holder for a welding electrode tip comprising a tubular member having a socket at one end adapted to frictionally retain the tip, a fitting detachably connected to the opposite end of said tubular member, said fitting comprising a tubular body having fluid inlet and outlet ports in its side wall, a sleeve carried by and slideably mounted in said fitting and adapted to extend through the opening in said tubular member into engagement with said tip, and means within said fitting outwardly of said sleeve to impart axial movement to said sleeve whereby said tip may be ejected from said tubular member.

9. A device according to claim 8 further including a pair of axially and radially yieldable bushings mounted in said fitting in axially spaced relation outwardly of the end of said sleeve, a tube carried by the innermost of said bushings and extending through said sleeve, said ports being on opposite sides of said innermost bushing, said movement imparting means comprising a member interposed between said bushings, said last mentioned member being operative to provide communication between one of said ports and the space within said tube.

10. A holder for welding electrode tips comprising a body having an opening therethrough and means at one end thereof to frictionally retain the tip, a fitting comprising a tubular member adapted to be connected to the opposite end of said body, said fitting having an internal shoulder adjacent its body connecting end, a sleeve having an integral flange adapted to engage said shoulder, said sleeve adapted to extend through the opening in said body into engagement with said tip, a pair of axially spaced bushings mounted in said fitting on the side of said flange opposite said shoulder, each of said fittings comprising inner and outer concentric rings and fluid impervious yieldable material bonded to the rings, the innermost of said bushings supporting a tube extending through said sleeve, and a port in the side wall of said fitting on either side of said innermost bushing.

11. A device according to claim 10 further including means extending through said flange providing communication between the port on the inner side of said inner most bushing and the space within said sleeve, the axial opening through said flange being restricted at its outer end to closely fit about said tube, and means comprising a member interposed between the inner rings of said bushings to impart sliding movement to said sleeve, said last mentioned member having an opening providing communication between the port on the outerside of said inner most bushing and the space within said tube.

12. A welding electrode holder comprising a tubular member having means at one end to retain a welding electrode, a pair of spaced bushings in said member adjacent the other end thereof and having fluid-tight interconnections with the side wall of said member, a tube anchored in the innermost of said bushings and extending longitudinally in said member to adjacent said electrode, means sealing the outermost of said bushings to prevent the leakage of coolant fluid therethrough, and fluid ports in the side wall of said member on opposite sides of the innermost of said bushings.

13. A welding electrode holder comprising a tubular member adapted to retain a welding electrode at one end thereof, a hollow fitting detachably connected to the opposite end of said tubular member, and having longitudinally spaced fluid ports in its side wall, a bushing in said fitting intermediate said ports and having fluid-tight connection with the side wall of said fitting, a tube anchored in said bushing and extending longitudinally into said member, said bushing being resilient and axially yieldable.

14. A welding electrode holder comprising in combination a tubular member having means at one end to retain a welding electrode, a pair of spaced bushings in said member adjacent its opposite end thereof and having fluid-tight inter-connections with the side wall of said tubular member, each of said bushings comprising a pair of concentric metallic rings separated by an annulus of fluid impervious yieldable material, a tube secured in the inner ring of the innermost of said bushings and extending through said tubular member toward said electrode, fluid ports in the side wall of said tubular member on opposite sides of the innermost of said bushings, and plug means in the inner ring of the outermost of said bushings.

MELVIN M. SEELOFF.